(12) United States Patent
Rivera

(10) Patent No.: US 9,232,872 B2
(45) Date of Patent: *Jan. 12, 2016

(54) SINGLE SERVING REUSABLE BREWING MATERIAL HOLDER

(75) Inventor: Adrian Rivera, Las Vegas, NV (US)

(73) Assignee: ARM Enterprises, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,875

(22) Filed: Jul. 11, 2012

(65) Prior Publication Data

US 2012/0276264 A1 Nov. 1, 2012

Related U.S. Application Data

(63) Continuation-in-part of application No. 11/777,831, filed on Jul. 13, 2007, now abandoned, and a continuation-in-part of application No. 12/610,181, filed on Oct. 30, 2009, and a continuation-in-part of application No. 12/620,584, filed on Nov. 17, 2009, now Pat. No. 8,291,812.

(51) Int. Cl.
| | |
|---|---|
| *A23G 1/10* | (2006.01) |
| *A47J 31/00* | (2006.01) |
| *A47J 31/44* | (2006.01) |
| *A47J 31/06* | (2006.01) |
| *B65D 85/804* | (2006.01) |

(52) U.S. Cl.
CPC ......... *A47J 31/0689* (2013.01); *B65D 85/8043* (2013.01); *Y02W 30/807* (2015.05)

(58) Field of Classification Search
CPC . A47J 31/407; A47J 31/4403; A47J 31/4407; A47J 31/3628; A47J 31/368; B65D 85/8043; B65D 85/8046; A23F 5/262; A23F 3/18; A23F 3/14; A23F 5/18; A23F 5/243
USPC ............ 99/279, 485, 287, 289 R, 295, 302 R, 99/306, 323; 426/77–80, 112, 115, 132, 426/135, 394
See application file for complete search history.

(56) References Cited

U.S. PATENT DOCUMENTS

| | | | |
|---|---|---|---|
| 2,433,815 A | 12/1947 | Laforge | |
| 3,022,411 A * | 2/1962 | Soper et al. | .................... 219/441 |
| 3,115,822 A | 12/1963 | Totten | |

(Continued)

FOREIGN PATENT DOCUMENTS

WO WO 2005/092160 A1 10/2005

*Primary Examiner* — Eric Stapleton
(74) *Attorney, Agent, or Firm* — IP Strategies

(57) ABSTRACT

A single serving beverage filter cartridge is formed by placing a single serving portion of brewing material into a reusable coffee holder having a lid and a base. The reusable coffee holder includes a recessed region at the bottom of a base of the holder and is insertable into a cartridge housing of a single serving coffee maker having an offset needle reaching up vertically from the base of the housing, the recessed region may be a large annular recessed region or a smaller off-center recessed region thereby avoiding the offset bottom needle. The coffee holder defines a frustoconical exterior and includes mesh filtering material for retaining brewing material inside the coffee holder. The mesh material may be a metal mesh or plastic mesh. The reusable coffee holder is configured for use in single serving coffee makers having the offset bottom needle and designed for single use cartridges.

31 Claims, 6 Drawing Sheets

(56) References Cited

U.S. PATENT DOCUMENTS

| | | | |
|---|---|---|---|
| 3,120,170 A | 2/1964 | Garte | |
| 3,136,241 A | 6/1964 | Price | |
| 3,199,682 A | 8/1965 | Scholtz | |
| 3,224,360 A * | 12/1965 | Wickenberg et al. | 99/292 |
| 3,316,388 A * | 4/1967 | Wickenberg et al. | 219/442 |
| 3,336,857 A * | 8/1967 | Knodt et al. | 99/296 |
| 3,384,004 A | 5/1968 | Perlman et al. | |
| 3,403,617 A * | 10/1968 | Lampe | 99/295 |
| 3,405,630 A | 10/1968 | Weber, III | 99/282 |
| 3,583,308 A | 6/1971 | Williams | |
| 3,592,126 A * | 7/1971 | Dombrowik | 99/312 |
| 3,607,297 A | 9/1971 | Fasano | |
| 3,695,168 A * | 10/1972 | Van Brunt | 99/306 |
| 3,757,670 A * | 9/1973 | Laama et al. | 99/302 R |
| 3,844,206 A * | 10/1974 | Weber | 99/282 |
| 3,948,157 A * | 4/1976 | Layre | 99/289 R |
| 3,958,502 A * | 5/1976 | Vitous | 99/300 |
| 4,052,318 A * | 10/1977 | Krebs | 210/337 |
| 4,086,848 A * | 5/1978 | Hahn | 99/323 |
| 4,143,590 A * | 3/1979 | Kasakoff | 99/296 |
| 4,221,670 A * | 9/1980 | Ziemek | 210/474 |
| 4,253,385 A | 3/1981 | Illy | |
| 4,286,515 A | 9/1981 | Baumann et al. | |
| 4,510,853 A * | 4/1985 | Takagi | 99/286 |
| 4,550,024 A * | 10/1985 | le Granse | 426/77 |
| 4,603,621 A * | 8/1986 | Roberts | 99/307 |
| 4,703,687 A * | 11/1987 | Wei | 99/286 |
| 4,704,954 A * | 11/1987 | Mollenhoff | 99/279 |
| 4,706,555 A * | 11/1987 | Nakamura et al. | 99/283 |
| 4,721,835 A * | 1/1988 | Welker | 219/689 |
| 4,739,697 A * | 4/1988 | Roberts | 99/295 |
| 4,832,845 A * | 5/1989 | Hendretti | 210/470 |
| 4,833,979 A * | 5/1989 | Garulli et al. | 99/287 |
| 4,858,523 A * | 8/1989 | Helbling | 99/280 |
| 4,865,737 A * | 9/1989 | McMichael | 210/477 |
| 4,967,648 A * | 11/1990 | Helbling | 99/286 |
| 4,986,172 A * | 1/1991 | Hunnicutt, Jr. | 99/306 |
| 4,998,463 A * | 3/1991 | Precht et al. | 99/300 |
| 5,000,082 A * | 3/1991 | Lassota | 99/304 |
| 5,012,059 A * | 4/1991 | Boatman | 219/689 |
| 5,028,328 A * | 7/1991 | Long | 210/477 |
| 5,046,409 A * | 9/1991 | Henn | 99/307 |
| 5,072,660 A * | 12/1991 | Helbling | 99/280 |
| 5,123,335 A | 6/1992 | Aselu | |
| 5,190,653 A * | 3/1993 | Herrick et al. | 210/477 |
| 5,233,914 A | 8/1993 | English | |
| 5,242,702 A * | 9/1993 | Fond | 426/433 |
| 5,265,517 A * | 11/1993 | Gilbert | 99/280 |
| 5,287,797 A * | 2/1994 | Grykiewicz et al. | 99/295 |
| 5,325,765 A * | 7/1994 | Sylvan et al. | 99/295 |
| 5,335,589 A | 8/1994 | Yerves et al. | |
| 5,343,799 A * | 9/1994 | Fond | 99/295 |
| 5,347,916 A * | 9/1994 | Fond et al. | 99/295 |
| 5,363,745 A * | 11/1994 | Lin | 99/306 |
| 5,398,596 A * | 3/1995 | Fond | 99/295 |
| 5,401,328 A * | 3/1995 | Schmitz | 134/58 R |
| 5,403,605 A * | 4/1995 | Smith et al. | 426/433 |
| 5,406,882 A * | 4/1995 | Shaanan | 99/287 |
| 5,463,932 A * | 11/1995 | Olson | 99/280 |
| 5,490,448 A * | 2/1996 | Weller et al. | 99/305 |
| 5,526,733 A | 6/1996 | Klawuhn et al. | |
| 5,531,152 A * | 7/1996 | Gardosi | 99/289 R |
| 5,562,941 A * | 10/1996 | Levy | 426/433 |
| 5,582,730 A | 12/1996 | Hugentobler | |
| 5,582,731 A * | 12/1996 | Gianfranco | 210/477 |
| 5,635,233 A * | 6/1997 | Levinson | 426/433 |
| 5,636,563 A * | 6/1997 | Oppermann et al. | 99/285 |
| 5,669,287 A * | 9/1997 | Jefferson et al. | 99/299 |
| 5,676,041 A | 10/1997 | Glucksman et al. | |
| 5,775,206 A * | 7/1998 | St-Gelais | 99/323 |
| 5,829,340 A | 11/1998 | Yang | |
| 5,840,189 A * | 11/1998 | Sylvan et al. | 210/474 |
| 5,865,094 A * | 2/1999 | Kealy | 99/291 |
| 5,870,943 A | 2/1999 | Levi et al. | |
| 5,887,510 A * | 3/1999 | Porter | 99/287 |
| 5,897,899 A * | 4/1999 | Fond | 426/112 |
| 5,924,563 A * | 7/1999 | Salyers | 206/223 |
| 5,932,260 A * | 8/1999 | Soughan | 426/78 |
| 6,065,609 A * | 5/2000 | Lake | 210/474 |
| 6,136,352 A | 10/2000 | Silverstein et al. | |
| 6,189,438 B1 * | 2/2001 | Bielfeldt et al. | 99/321 |
| RE37,173 E * | 5/2001 | Jefferson et al. | 99/299 |
| 6,227,102 B1 * | 5/2001 | Sham et al. | 99/286 |
| 6,231,909 B1 * | 5/2001 | Levinson | 426/433 |
| 6,250,209 B1 * | 6/2001 | Pope | 99/323 |
| 6,253,662 B1 * | 7/2001 | Zelson | 99/279 |
| 6,263,781 B1 * | 7/2001 | Calagui | 99/323 |
| D454,433 S | 3/2002 | Peter | |
| D454,434 S | 3/2002 | McDaniel et al. | |
| 6,440,256 B1 | 8/2002 | Gordon et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,645,537 B2 | 11/2003 | Sweeney et al. | |
| 6,655,260 B2 * | 12/2003 | Lazaris et al. | 99/295 |
| 6,658,989 B2 | 12/2003 | Sweeney et al. | |
| 6,662,955 B1 * | 12/2003 | Lassota | 210/482 |
| 6,708,600 B2 * | 3/2004 | Winkler et al. | 99/295 |
| 6,727,484 B2 * | 4/2004 | Policappelli | 219/689 |
| 6,740,345 B2 * | 5/2004 | Cai | 426/77 |
| 6,758,130 B2 * | 7/2004 | Sargent et al. | 99/295 |
| 6,786,136 B2 * | 9/2004 | Cirigliano et al. | 99/323 |
| 6,832,542 B2 | 12/2004 | Hu et al. | |
| 6,843,165 B2 | 1/2005 | Stoner | |
| D502,362 S | 3/2005 | Lazaris et al. | |
| 6,904,840 B1 | 6/2005 | Pfeifer et al. | |
| 6,948,420 B2 | 9/2005 | Kirschner et al. | |
| 6,968,775 B2 * | 11/2005 | Burrows et al. | 99/303 |
| 7,047,870 B2 | 5/2006 | Gantt et al. | |
| 7,081,263 B2 | 7/2006 | Albrecht | |
| 7,131,369 B2 | 11/2006 | Gantt et al. | |
| 7,320,274 B2 * | 1/2008 | Castellani | 99/295 |
| 7,946,217 B2 * | 5/2011 | Favre et al. | 99/295 |
| 8,047,127 B2 | 11/2011 | Lin | |
| 8,087,347 B2 * | 1/2012 | Halliday et al. | 99/295 |
| 2001/0043954 A1 * | 11/2001 | Sweet | 424/725 |
| 2002/0005367 A1 * | 1/2002 | Zelson | 206/449 |
| 2002/0023543 A1 * | 2/2002 | Schmed | 99/295 |
| 2002/0035929 A1 * | 3/2002 | Kanba et al. | 99/279 |
| 2002/0048621 A1 * | 4/2002 | Boyd et al. | 426/77 |
| 2002/0059870 A1 * | 5/2002 | Walters, Jr. et al. | 99/298 |
| 2002/0078831 A1 * | 6/2002 | Cai | 99/295 |
| 2002/0148356 A1 * | 10/2002 | Lazaris et al. | 99/295 |
| 2003/0006185 A1 * | 1/2003 | Hepler | 210/464 |
| 2003/0041739 A1 * | 3/2003 | Cai | 99/287 |
| 2003/0167928 A1 * | 9/2003 | Mulle et al. | 99/279 |
| 2003/0200872 A1 * | 10/2003 | Lin | 99/293 |
| 2003/0213370 A1 * | 11/2003 | Hammad et al. | 99/300 |
| 2003/0222089 A1 * | 12/2003 | Hale | 220/912 |
| 2003/0226449 A1 * | 12/2003 | Carasso et al. | 99/279 |
| 2004/0020368 A1 * | 2/2004 | Cai | 99/279 |
| 2004/0020922 A1 * | 2/2004 | Alves | 219/679 |
| 2004/0118290 A1 * | 6/2004 | Cai | 99/275 |
| 2004/0182247 A1 * | 9/2004 | Guerrero | 99/275 |
| 2004/0244600 A1 * | 12/2004 | Lalanne-Eygun | 99/279 |
| 2005/0051478 A1 * | 3/2005 | Karanikos et al. | 210/469 |
| 2005/0160918 A1 * | 7/2005 | Winstanley et al. | 99/279 |
| 2005/0172819 A1 * | 8/2005 | Chen et al. | 99/279 |
| 2005/0236323 A1 * | 10/2005 | Oliver et al. | 210/464 |
| 2005/0257695 A1 * | 11/2005 | Dobranski et al. | 99/485 |
| 2005/0284303 A1 * | 12/2005 | Zell et al. | 99/279 |
| 2006/0019000 A1 * | 1/2006 | Zanetti | 426/112 |
| 2006/0107841 A1 * | 5/2006 | Schifferle | 99/279 |
| 2006/0159815 A1 | 7/2006 | Crook et al. | |
| 2006/0174769 A1 | 8/2006 | Favre et al. | |
| 2006/0196364 A1 | 9/2006 | Kirschner | |
| 2007/0175334 A1 * | 8/2007 | Halliday et al. | 99/279 |
| 2007/0277677 A1 * | 12/2007 | Roberg | 99/323 |
| 2009/0229471 A1 | 9/2009 | Lun et al. | |
| 2010/0083843 A1 | 4/2010 | Denisart et al. | |
| 2010/0288131 A1 * | 11/2010 | Kilber et al. | 99/295 |
| 2010/0303964 A1 * | 12/2010 | Beaulieu et al. | 426/77 |

(56) References Cited

U.S. PATENT DOCUMENTS

| | | | |
|---|---|---|---|
| 2011/0209623 A1 | 9/2011 | Leung et al. | |
| 2011/0274802 A1* | 11/2011 | Rivera | 426/431 |
| 2012/0207895 A1* | 8/2012 | Rivera | 426/433 |
| 2012/0207896 A1* | 8/2012 | Rivera | 426/433 |
| 2012/0276264 A1* | 11/2012 | Rivera | 426/433 |
| 2012/0285330 A1 | 11/2012 | Demiglio et al. | |
| 2012/0285334 A1 | 11/2012 | Demiglio et al. | |
| 2013/0017303 A1* | 1/2013 | Vu | 426/433 |
| 2013/0025466 A1* | 1/2013 | Fu et al. | 99/295 |
| 2013/0156897 A1* | 6/2013 | Goldstein | 426/115 |
| 2014/0245895 A1 | 9/2014 | Demiglio et al. | |
| 2014/0287105 A1* | 9/2014 | Husband et al. | 426/115 |

* cited by examiner

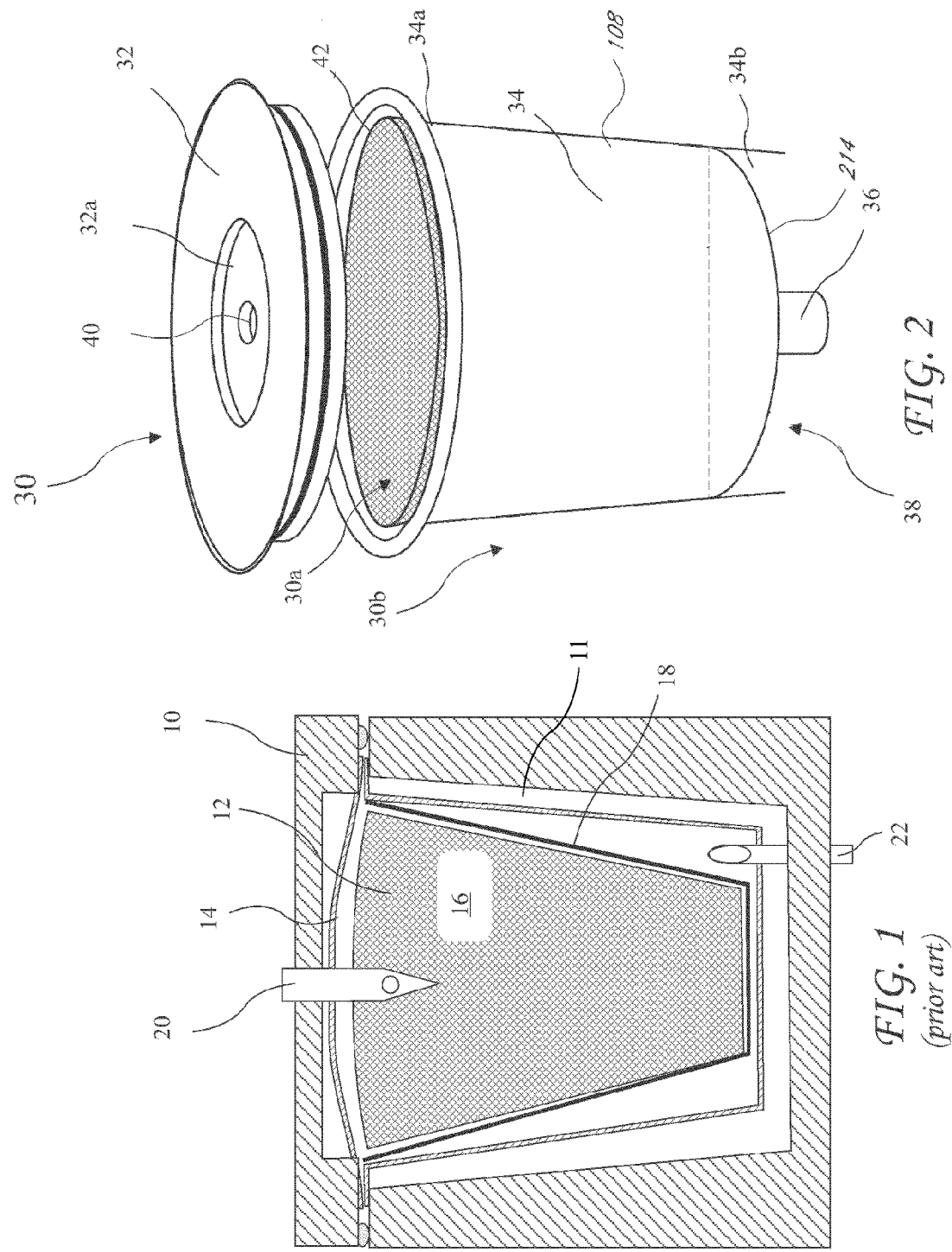

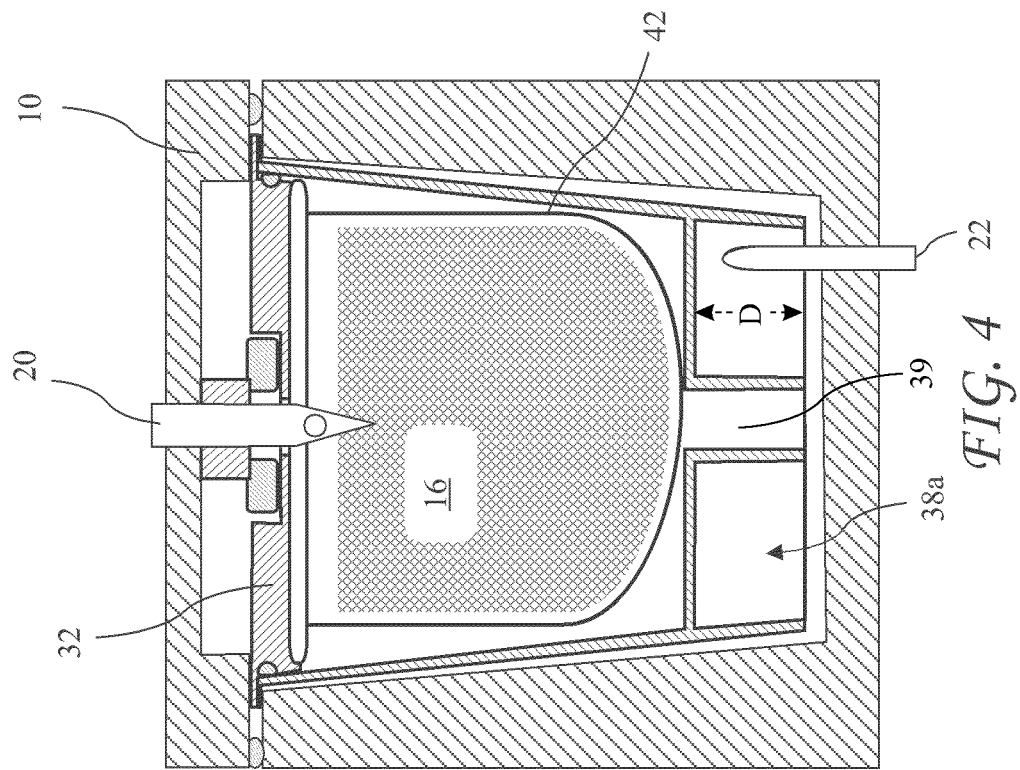
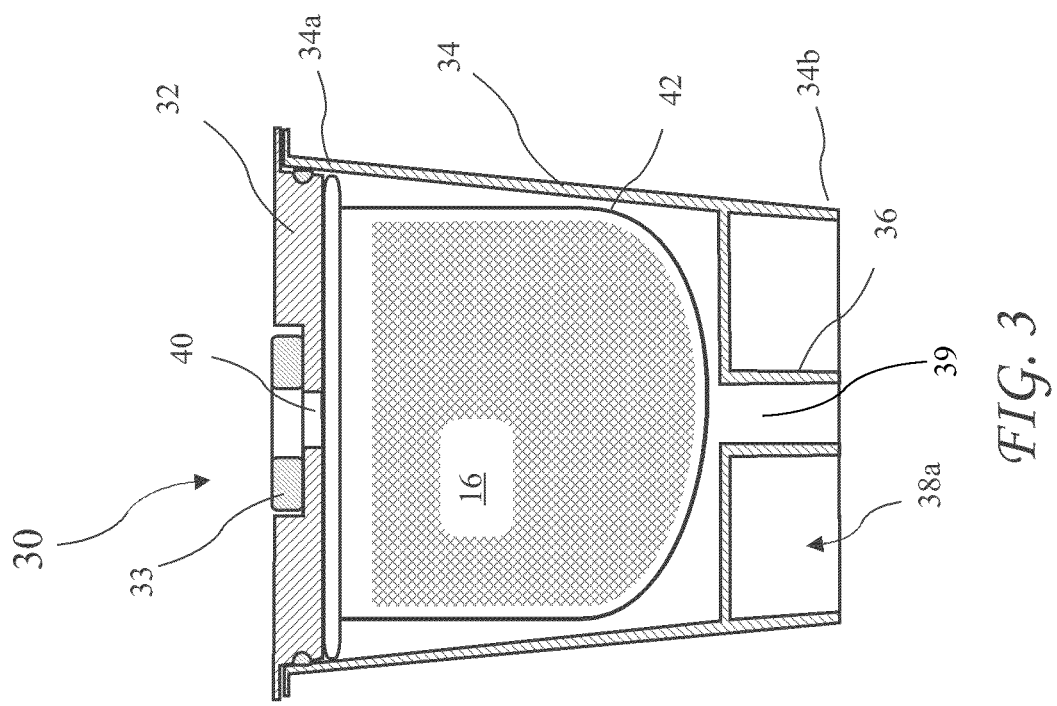

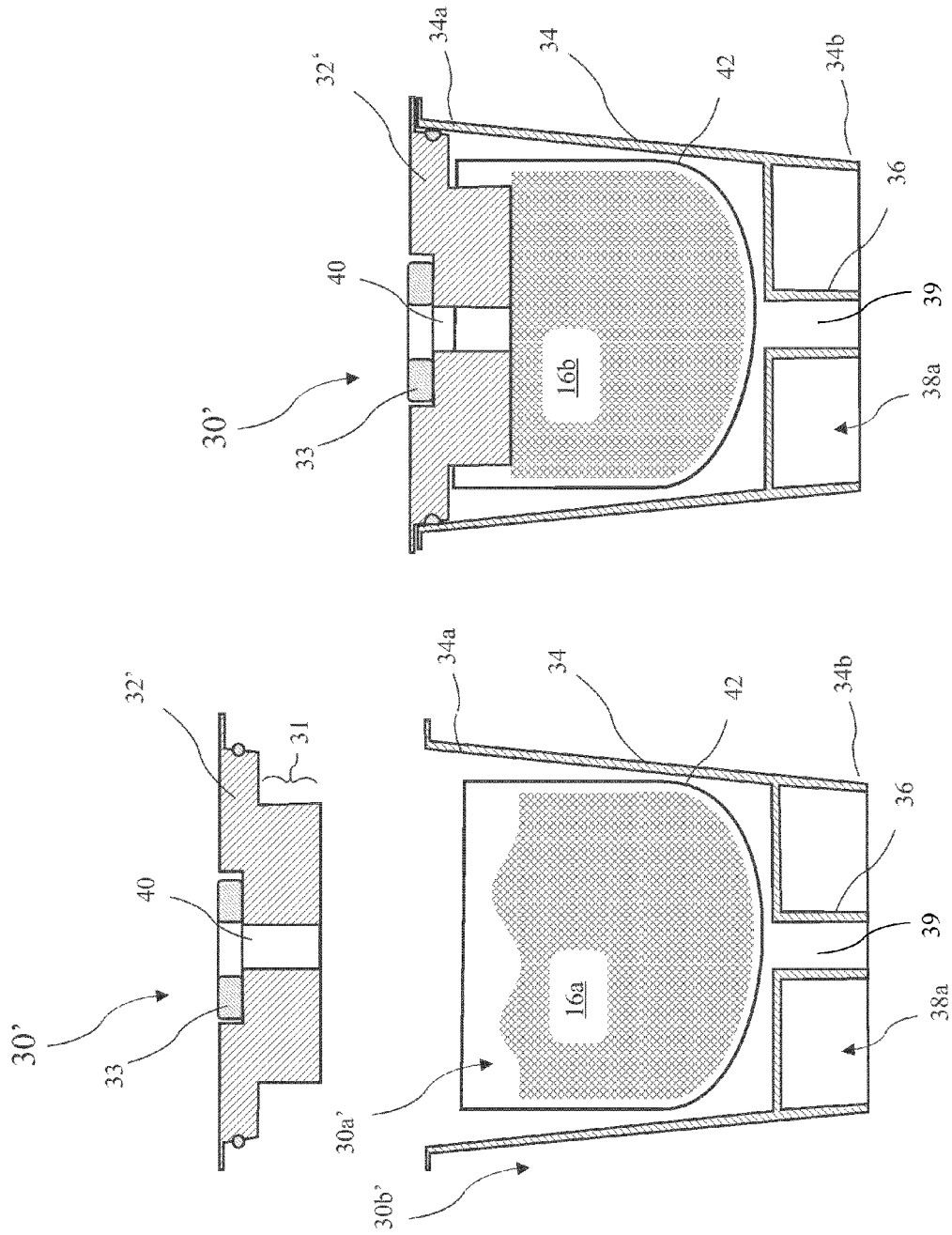

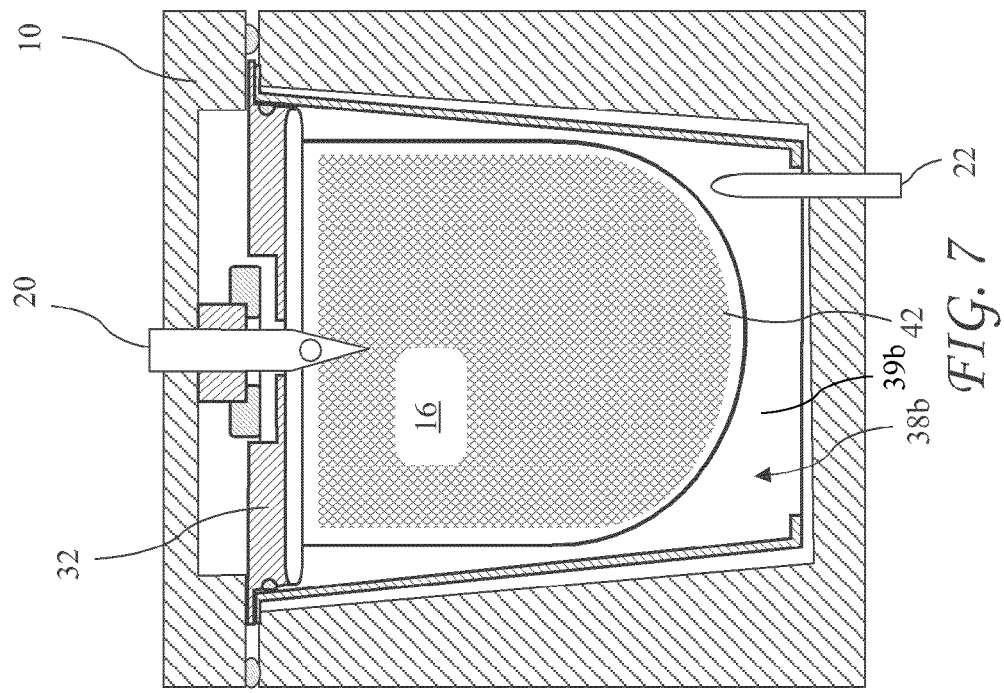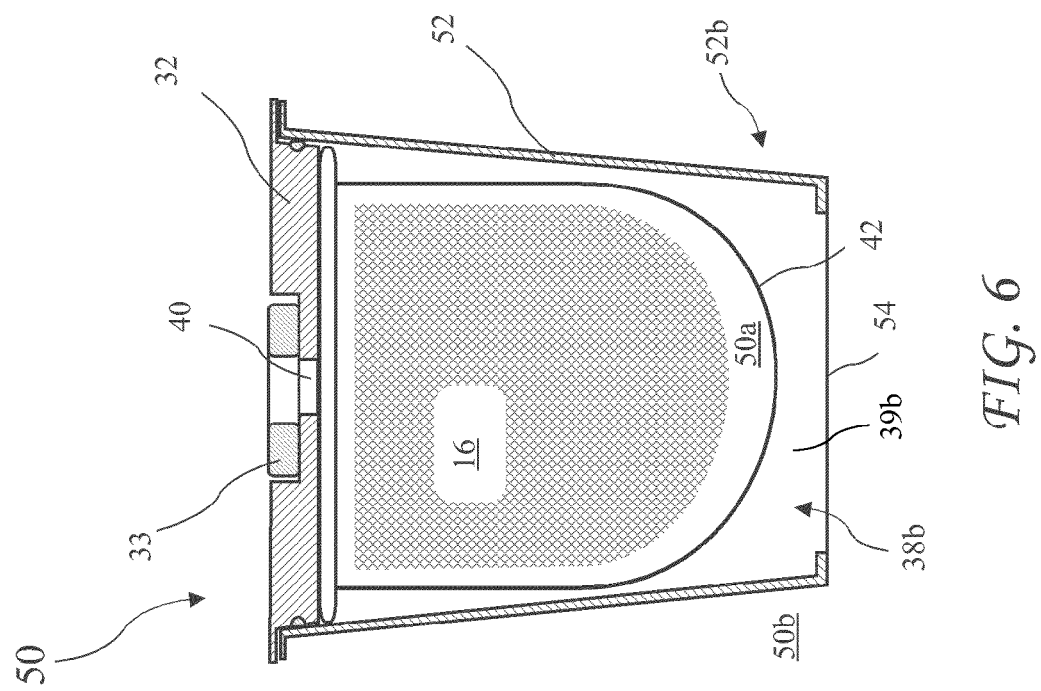

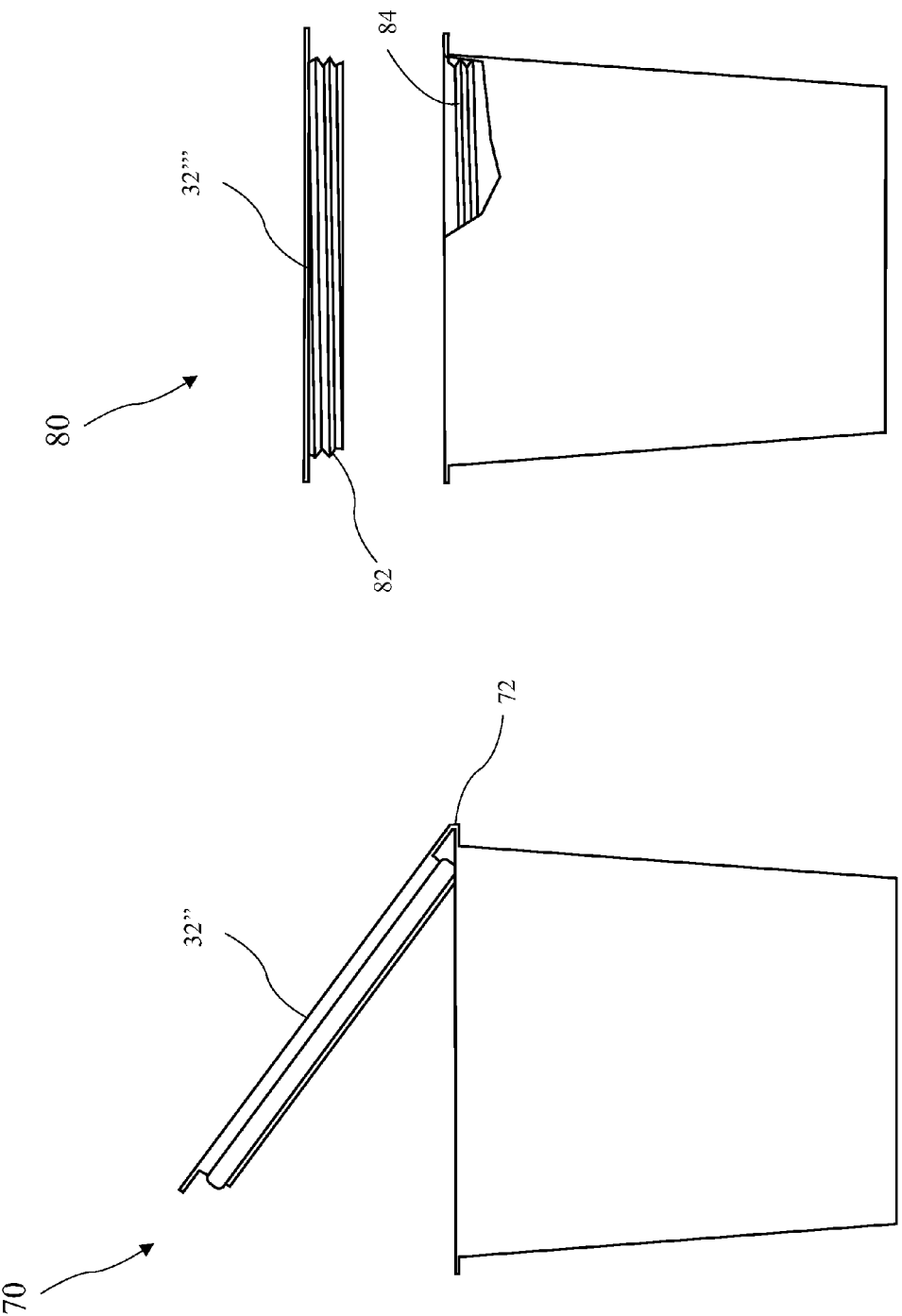

SINGLE SERVING REUSABLE BREWING MATERIAL HOLDER

CROSS-REFERENCE TO RELATED APPLICATIONS

The present application is a Continuation In Part of U.S. patent application Ser. No. 11/777,831 filed Jul. 13, 2007; a Continuation In Part of U.S. patent application Ser. No. 12/610,181 filed Oct. 30, 2009; and a Continuation In Part of U.S. patent application Ser. No. 12/620,584 filed Nov. 17, 2009, which applications are incorporated in their entirety herein by reference.

BACKGROUND OF THE INVENTION

The present invention relates to single serving coffee makers and in particular to a single serving reusable brewing material holder including a reusable mesh material to retain the brewing material in the holder.

Coffee is prepared in a coffee maker by measuring an amount of ground coffee into a coffee filter, closing a lid over the ground coffee, and providing a stream of hot water through the ground coffee. In recent years, single serving coffee makers have become very popular, for example, KEURIG® coffee makers. U.S. Pat. Nos. 5,325,765 and 6,708,600 disclose a housing and cooperating filter cartridge for use in a KEURIG®. coffee maker. While the housing and cartridge of the '765 patent are very popular, the cost of single use cartridges far exceeds the cost of the brewing material contained in the cartridges. The '765 and '600 patents are herein incorporated by reference in their entirety.

SUMMARY OF THE INVENTION

The present invention addresses the above and other needs by providing a single serving beverage filter cartridge which is formed by placing a single serving portion of brewing material into a reusable coffee holder having a lid and a base. The reusable coffee holder includes a recessed region at the bottom of a base of the holder and is insertable into a cartridge housing of a single serving coffee maker having an offset needle reaching up vertically from the base of the housing, the recessed region may be a large annular recessed region or a smaller off-center recessed region, thereby avoiding the offset bottom needle. The coffee holder defines a frustoconical exterior and includes mesh filtering material for retaining brewing material inside the coffee holder. The mesh material may be a metal mesh or plastic mesh. The reusable coffee holder is configured for use in single serving coffee makers having the offset bottom needle and designed for single use cartridges.

In accordance with one aspect of the invention, there is provided a coffee holder including a metal mesh filter material interposed between an interior and exterior of the holder to retain brewing material in the holder. The mesh filter material may be a metal or plastic mesh.

In accordance with another aspect of the invention, there is provided a coffee holder having a bottom with an annular recess. The holder fits into existing single serving coffee makers having an offset bottom needle and the annular recess provides clearance for the offset bottom needle.

In accordance with still another aspect of the invention, there is provided a coffee holder having a bottom with an offset recess. The holder fits into existing single serving coffee makers having an offset bottom needle and the offset recess provides clearance for the offset bottom needle.

In accordance with yet another aspect of the invention, there is provided a method for using a reusable coffee holder in a single serving coffee maker. The method includes opening a lid of the reusable coffee holder, placing a single serving portion of brewing material into a holder base, closing the lid of the coffee holder, opening a coffee cartridge housing of the single serving coffee maker to expose the interior of the coffee cartridge housing, the base of the coffee cartridge housing including a upward reaching offset needle, placing the coffee holder in the coffee cartridge housing, positioning a recessed area in the bottom of the holder base over the offset needle, closing the coffee cartridge housing, and brewing a brewed beverage. The reusable coffee holder includes a holder lid, a frustoconical shaped coffee holder base, a metal mesh filter material attached to the coffee holder base and interposed between the interior and the exterior of the holder base and retaining brewing material deposited into the holder base through the holder top, and a holder lid closeable over the top of the holder base. The metal mesh filter material may be fixed to the holder base, or removable from the holder base. The holder lid may include a center mating portion of the holder lid including a downward concave cavity for receiving a nozzle of a coffee maker and sealing against the coffee maker to prevent the escape of heated liquid during brewing. The frustoconical shaped coffee holder base includes a smaller diameter bottom, a larger diameter top, an interior, an exterior, and a upward recessed area in the bottom of the holder base.

BRIEF DESCRIPTION OF THE DRAWINGS

The above and other aspects, features and advantages of the present invention will be more apparent from the following more particular description thereof, presented in conjunction with the following drawings wherein:

FIG. 1 shows a prior art coffee cartridge housing of a single serving coffee maker, with a filter cartridge residing in the coffee cartridge housing.

FIG. 2 is a perspective view of a first single serving coffee holder according to the present invention.

FIG. 3 is a cross-sectional side view of the first single serving coffee holder containing coffee restrained in a holder base by mesh filter material and having an annular recess in the bottom of the holder base, according to the present invention.

FIG. 4 is a cross-sectional side view of the first single serving coffee holder according to the present invention in the prior art single serving coffee cartridge housing.

FIG. 5A shows a cross-sectional side view of a tamping single serving coffee holder having a lid including a tamper which enters the holder base to tamp coffee restrained in the holder base by mesh filter material, and having an annular recess in the bottom of the holder base, according to the present invention.

FIG. 5B shows a cross-sectional side view of the tamping single serving coffee holder having the lid including the tamper attached to the holder base and tamping the coffee restrained in the holder base by the mesh filter material, according to the present invention.

FIG. 6 is a cross-sectional side view of a second single serving coffee holder containing coffee restrained in a holder base by mesh filter material and having an annular recess in the bottom of the holder base, according to the present invention.

FIG. 7 is a cross-sectional side view of the second single serving coffee holder according to the present invention in the prior art single serving coffee cartridge housing.

FIG. 10 shows a side view of a holder 70 having a hinged holder lid 32"

FIG. 11 shows a side view of a threaded holder and threaded holder lid according to the present invention.

Corresponding reference characters indicate corresponding components throughout the several views of the drawings.

DETAILED DESCRIPTION OF THE PREFERRED EMBODIMENT

Figure 9:
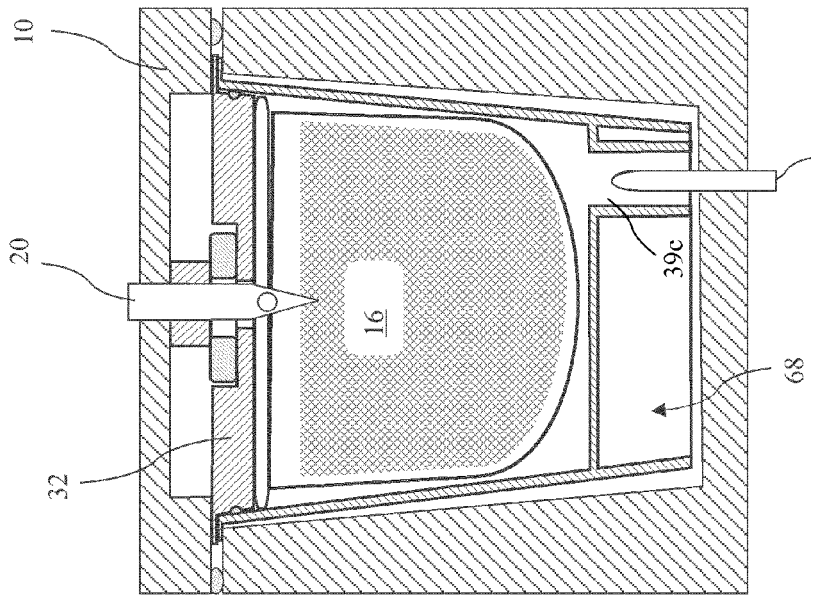
FIG. 9 is a cross-sectional side view of the third single serving coffee holder according to the present invention in the prior art single serving coffee cartridge housing.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A prior art single serving cartridge housing 10 of a coffee maker, and a single use filter cartridge 12 residing in a brewing chamber 11 of the coffee maker, disclosed in U.S. Pat. Nos. 5,325,765 and 6,708,600 (incorporated by reference above) are shown in FIG. 1. The filter cartridge 12 includes a pierceable shell 14 and contains brewing material 16. An upper needle 20 penetrates the top of the shell 14 to inject heated water into the cartridge 12 and an offset bottom needle 22 penetrates the bottom of the shell 14 and receives the brewed drink produced in the cartridge 12 and carries the brewed drink from the brewing chamber, when the housing 10 is closed on the cartridge 12. A filter cartridge sold under the trademark K-CUP® has a top edge with a diameter of about 1.8 inches, a height of about 1¾ inches, and a frustoconical shape with a base smaller than the top edge. The base of the K-CUP® cartridge is generally being about 1.45 inches in diameter.

A perspective view of a first single serving coffee holder 30 according to the present invention is shown in FIG. 2. The coffee holder 30 includes a lid 32 and a base 34. The base 34 includes a larger diameter top 34a and a smaller diameter bottom 34b and is generally frustoconical in shape. A passage 40 in the lid 32 is provided for the needle 20. The bottom 34b of the base 34 includes an annular recessed region 38 surrounding a stem 36 generally centered in the bottom 34b of the base 34. The stem 36 extends downward in the bottom 34b of the base 34. Lid 32 may be removably attachable to the base 34, or hingedly attached to the base 34. The removable lid 32 may be an interference fit to the base 34, or the lid 32 and base 34 may have cooperating threads to threadably attach, or the lid 32 may be otherwise attached to the base 34. The coffee holder 30 defines an interior region 30a and an exterior region 30b and a mesh filter 42 resides in the base 34 to restrain brewing material in the interior region 30a.

A cross-sectional side view of the first single serving coffee holder 30 containing coffee 16 restrained in the holder base 34 by the mesh filter material 42 and having an annular recess 38a in the bottom of the holder base 34 is shown in FIG. 3 and a cross-sectional side view of the first single serving coffee holder 30 in the prior art single serving coffee cartridge housing 10 is shown in FIG. 4. The mesh filter 42 holds the brewing material 16, and retains the brewing material 16 in the interior region 30a of the coffee holder 30 separating the brewing material 16 from the exterior region 30b of the coffee holder 30. The mesh filter 42 may be a fixed filter not removable from the holder base 34 or a removable filter, and may be constructed of nylon mesh or metal mesh, or any reusable material capable of holding the coffee while allowing a flow of heated water through the coffee. Unlike filter paper, the mesh filter 42 may be cleaned and reused. The needle 20 reaches through the passage 40 in the lid 32 to inject hot liquid into the brewing material 16 to make a brewed drink. The annular recess 38a provides clearance D for the lower needle 22 of the coffee maker without requiring aligning the annular recessed area 38a with the offset bottom needle 22, and the opening 39 in the bottom of the holder base 34 allows brewed beverage to escape from the coffee holder into the brewing chamber 11 of the coffee maker. The clearance D is preferably between one and twenty mm and more preferably about ten mm to a ceiling 38b of the annular recessed area 38a. A compliant ring 33 may be included to seal against the coffee maker.

The housing 30 is disclosed in FIG. 2 of U.S. patent application Ser. No. 11/777,831 filed Jul. 13, 2007 by the present applicant, which this application is a Continuation In Part thereof.

The mesh filter 42 is disclosed in paragraph 0005 of the summary in U.S. patent application Ser. No. 12/620,584 filed Nov. 17, 2009, by the present applicant, which this application is a Continuation In Part thereof, as a fixed or removable nylon mesh, metal mesh, or any material capable of holding the coffee while allowing a flow of heated water through the coffee.

A cross-sectional view of a tamping single serving coffee holder 30' having a lid 32' including a tamper 31, is shown in FIG. 5A, and a cross-sectional view of the tamping single serving coffee holder 30' having the lid 32' attached to the holder base 34 is shown in FIG. 5B. When the lid 32' is attached to the holder base 34, the tamper 31 enters the holder base 34 to tamp coffee 16a restrained in the holder base 34 by the mesh filter material 42. Tamping the coffee reduces or prevents channeling and generally provides a stronger brew. The coffee holder 30' is otherwise similar to the coffee holder 30.

A cross-sectional side view of a second single serving coffee holder 50 containing coffee 16 is shown in FIG. 6 and a cross-sectional side view of the second single serving coffee holder 50 in the prior art single serving coffee cartridge housing 10 is shown in FIG. 7. The coffee holder 50 includes the lid 32 and a holder base 52. The coffee 16 is restrained in the holder base 52 by the mesh filter material 42. A second annular recess 38b in the bottom 52b of the holder base 52 is provided to clear the bottom needle 22 and the passage 40 in the lid 32 is provided for the needle 20 and opening 39b in the bottom of the coffee holder 50 allows brewed beverage to escape from the coffee holder into the brewing chamber 11 of the coffee maker.

The coffee holder 50 defines an interior region 50a and an exterior region 50b (similar to the regions 30a and 30b in FIG. 2). The mesh filter 42 holds the brewing material 16, and retains the brewing material 16 in the interior region 50a of the coffee holder 50 separating the brewing material 16 from the exterior region 50b of the coffee holder 50. The needle 20 reaches through the passage 40 in the lid 32 to inject hot liquid into the brewing material 16 to make a brewed drink. The second annular recess 38b is provided by a large circular opening 54 in the bottom 52b of the base 52. The annular recess 38b provides clearance for the lower needle 22 without aligning the annular recess 38b with the needle 22. The coffee holder 50 is otherwise similar to the coffee holder 30.

The housing 50 is disclosed in FIG. 6 of U.S. patent application Ser. No. 11/777,831 filed Jul. 13, 2007 by the present applicant, which the present application is a Continuation In Part thereof.

Figure 8:
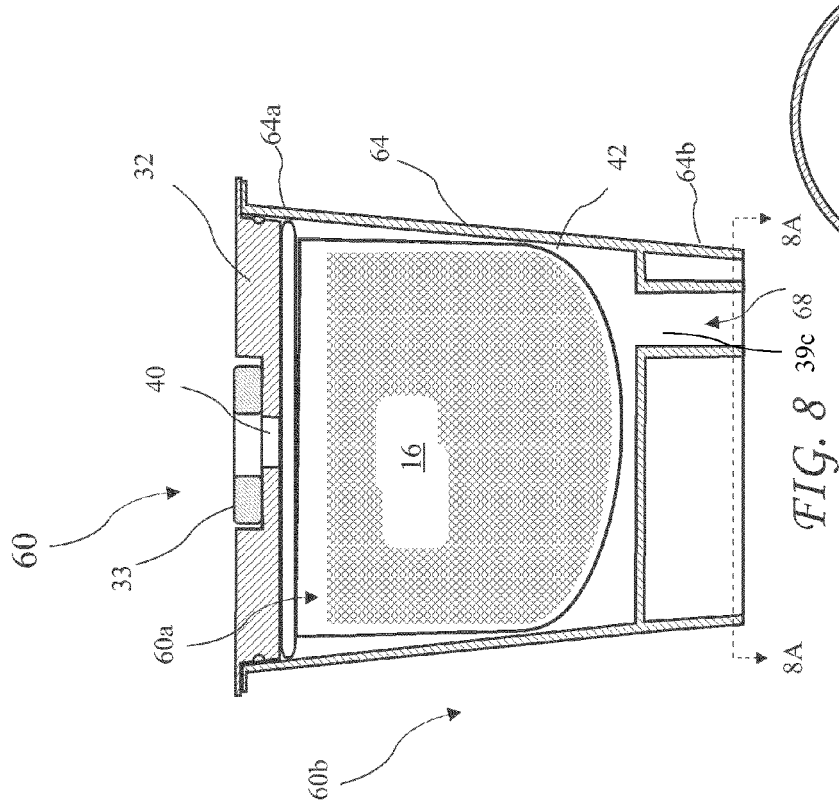
FIG. 8 is a cross-sectional side view of a third single serving coffee holder containing coffee restrained in a holder base by mesh filter material and having an offset recess in the bottom of the holder base, according to the present invention.
Figure 8A:
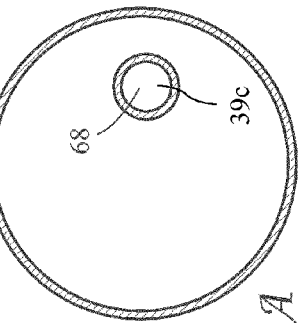
FIG. 8A is a cross-sectional view of the holder base taken along line 8A-8A of FIG. 8.

A cross-sectional side view of a third single serving coffee holder 60 containing coffee 16 restrained in a holder base 64 by the mesh filter material 42 is shown in FIG. 8, a cross-sectional view of the holder base 64 taken along line 8A-8A of FIG. 8 is shown in FIG. 8A, and a cross-sectional side view of the third single serving coffee holder 60 in the coffee cartridge housing 10 is shown in FIG. 9. An offset recess 68 in the bottom 64b of the holder base 64 provides clearance for the lower needle 22. The coffee holder 60 defines an interior region 60a and an exterior region 60b separated by the mesh filter material 42. The offset recess 68 is offset from a centerline CL of the coffee holder 60 and is not an annular recess (i.e., is a vertical passage somewhat larger than the needle 22) and requires aligning the offset recess 68 with the needle 22. While the offset recess 68 is shown as having a round cross-section, the offset recess 68 may have any cross-section suitable to provide clearance for the needle 22 and opening 39c in the bottom of the coffee holder 60 allows brewed beverage to escape from the coffee holder into the brewing chamber 11 of the coffee maker. The coffee holder 60 is otherwise similar to the coffee holder 30.

The offset recess 68 in the bottom 64b of the holder base 64 is disclosed in FIG. 5 of U.S. patent application Ser. No. 11/777,831 filed Jul. 13, 2007 by the present applicant, which the present application is a Continuation In Part thereof.

FIG. 10 shows a side view of a holder 70 having a hinged holder lid 32" hingedly attached to the holder by a hinge 72.

FIG. 11 shows a side view of a threaded holder 80 having a threaded holder lid 32'''. The holder lid 32''' has male threads 82 and the holder base A method for using a reusable coffee holder in a single serving coffee maker having an offset bottom needle includes the steps of: placing a single serving portion of brewing material into the holder base; attaching the holder lid to the top of the holder base; opening a brewing chamber of the single serving coffee maker; placing the coffee holder into the brewing chamber causing the offset bottom needle to reside in the recess in the bottom of the holder base and not puncture any part of the coffee holder; closing the coffee cartridge housing; brewing a brewed beverage; and creating a flow of the brewed beverage through the mesh filter and into the brewing chamber, the flow of the brewed beverage avoiding flowing through the bottom needle. The reusable coffee holder includes a coffee holder base and a holder lid. the holder base includes a smaller diameter holder bottom; a larger diameter holder top; an interior; an exterior, a recess in the bottom of the holder base configured to provide clearance for a bottom needle of the coffee maker; and a metal mesh filter fixed to the coffee holder base and interposed between the interior and the exterior of the holder base and retaining brewing material deposited into the holder base through the holder top. The holder lid is attachable to the top of the holder base and including a passage for receiving a nozzle of the coffee maker.

While the invention herein disclosed has been described by means of specific embodiments and applications thereof, numerous modifications and variations could be made thereto by those skilled in the art without departing from the scope of the invention set forth in the claims.

What is claimed is:

1. A beverage brewer, comprising:
a brewing chamber;
a container, disposed within the brewing chamber and adapted to hold brewing material while brewed by a beverage brewer, the container comprising:
 a receptacle configured to receive and support the brewing material; and
 a cover;
 wherein the receptacle includes
  a base, having an interior surface, an exterior surface, and a passageway in an interior area of the base, providing fluid flow through the interior surface and the exterior surface, and
  at least one sidewall extending upward from the interior surface of the base;
 wherein the cover is adapted to sealingly engage with a top edge of the at least one sidewall, the cover including an opening and a tamping projection that protrudes into the receptacle when the cover engages the top edge of the at least one sidewall, and
 wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway;
wherein the passageway is disposed to receive the needle-like structure and to provide a clearance around the needle-like structure such that the needle-like structure does not puncture the base.

2. The beverage brewer of claim 1, wherein the receptacle includes at least one extension that raises the base a predetermined distance above a lower surface of the brewing chamber, wherein the predetermined distance is selected such that a tip of the needle-like structure does not penetrate the exterior surface of the base.

3. The beverage brewer of claim 1, wherein the receptacle and the cover include materials such that the container is reusable.

4. The beverage brewer of claim 1, wherein the passageway has an unobstructed configuration.

5. The brewing material holder of claim 1, wherein the receptacle further includes a stem that extends downward below the exterior surface of the base from around a periphery of the passageway.

6. The beverage brewer of claim 1, wherein the container further comprises a mesh filter that is configured to be disposed within the receptacle and to receive and support the brewing material in the path of the fluid flow.

7. A beverage brewer, comprising:
a brewing chamber:
a container, disposed within the brewing chamber and adapted to hold brewing material while brewed by a beverage brewer, the container comprising:
 a receptacle configured to receive the brewing material; and
 a cover;
 wherein the receptacle includes
  a base, having an interior surface and an exterior surface, wherein at least a portion of the base is disposed a predetermined distance above a bottom surface of the brewing chamber, and
  at least one sidewall extending upward from the interior surface of the base, wherein the receptacle has at least one passageway that provides fluid flow from an interior of the receptacle to an exterior of the receptacle;

wherein the cover is adapted to sealingly engage with a top edge of the at least one sidewall the cover including an opening and a tamping projection that protrudes into the receptacle when the cover engages the top edge of the at least one sidewall, and wherein the container is adapted to accept input fluid through the opening and to provide a corresponding outflow of fluid through the passageway;

an inlet port, adapted to provide the input fluid to the container; and a needle-like structure, disposed below the base;

wherein the predetermined distance is selected such that a tip of the needle-like structure does not penetrate the exterior surface of the base.

8. The beverage brewer of claim 7, wherein at least one passageway of the at least one passageway is disposed in the base.

9. The beverage brewer of claim 7, wherein the receptacle also includes at least one extension that raises the at least a portion of the base the predetermined distance above the bottom surface of the brewing chamber.

10. The beverage brewer of claim 7, wherein the receptacle and the cover include materials such that the container is reusable.

11. The beverage brewer of claim 7, wherein at least one passageway of the at least one passageway is unobstructed.

12. The brewing material holder of claim 7, wherein the receptacle further includes a stem that extends downward below the exterior surface of the base from around a periphery of the passageway.

13. The beverage brewer of claim 7, wherein the container further comprises a mesh filter that is configured to be disposed within the receptacle and to receive and support the brewing material in the path of the fluid flow.

14. A beverage brewer, comprising:
a brewing chamber;
a container, disposed within the brewing chamber and adapted to hold brewing material while brewed by a beverage brewer, the container comprising:
a receptacle configured to receive the brewing material; and
a cover;
wherein the receptacle includes
a base, having an interior surface, an exterior surface, and a passageway in an interior area of the base, providing fluid flow through the interior surface and the exterior surface, and
at least one sidewall extending upward from the interior surface of the base,
wherein the receptacle is adapted to support the brewing material a predetermined distance above a lower surface of the brewing chamber,
wherein the cover is adapted to sealingly engage with a top edge of the at least one sidewall, the cover including an opening and a tamping projection that protrudes into the receptacle when the cover engages the top edge of the at least one sidewall, and
wherein the container is adapted to accept input fluid through the opening and to provide a corresponding outflow of fluid through the passageway;
an inlet port, adapted to provide the input fluid to the container; and
a needle-like structure, disposed below the brewing material;

wherein the predetermined distance is selected such that the needle-like structure does not touch the brewing material when held by the container.

15. The beverage brewer of claim 14, wherein the receptacle also includes at least one extension that raises the base the predetermined distance above the lower surface of the brewing chamber.

16. The beverage brewer of claim 14, wherein the receptacle and the cover include materials such that the container is reusable.

17. The beverage brewer of claim 14, wherein the passageway has an unobstructed configuration.

18. The brewing material holder of claim 14, wherein the receptacle further includes a stem that extends downward below the exterior surface of the base from around a periphery of the passageway.

19. The beverage brewer of claim 14, wherein the container further comprises a mesh filter that is configured to be disposed within the receptacle and to receive and support the brewing material in the path of the fluid flow.

20. A beverage brewer, comprising:
a brewing chamber;
a container, disposed within the brewing chamber and adapted to hold brewing material while brewed by a beverage brewer, the container comprising:
a receptacle configured to receive the brewing material; and
a cover;
wherein the receptacle includes
a base, having an interior surface, an exterior surface, and a passageway in an interior area of the base, providing fluid flow through the interior surface and the exterior surface, and
at least one sidewall extending upward from the interior surface of the base,
wherein the cover is adapted to sealingly engage with a top edge of the at least one sidewall, the cover including an opening and a tamping projection that protrudes into the receptacle when the cover engages the top edge of the at least one sidewall, and
wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway; and
wherein the passageway allows the outflow fluid to flow from the container.

21. The beverage brewer of claim 20, wherein the receptacle also includes at least one extension that raises at least a portion of the base a predetermined distance above a lower surface of the brewing chamber, wherein the predetermined distance is selected such that a tip of the needle-like structure does not penetrate the exterior surface of the base.

22. The beverage brewer of claim 20, wherein the receptacle and the cover include materials such that the container is reusable.

23. The beverage brewer of claim 20, wherein the passageway leas an unobstructed configuration.

24. The brewing material holder of claim 20, wherein the receptacle further includes a stem that extends downward below the exterior surface of the base from around a periphery of the passageway.

25. The beverage brewer of claim 20, wherein the container further comprises a mesh filter that is configured to be disposed within the receptacle and to receive and support the brewing material in the path of the fluid flow.

26. A beverage brewer including a brewing chamber configured to receive a brewing cartridge, an inlet port adapted to provide an input fluid, and a needle-like structure fixed in a bottom of the brewing chamber and adapted to puncture a shell of the brewing cartridge to carry an outflow of brewed beverage from the brewing cartridge and arranged to avoid puncturing filtering material containing brewing material disposed inside the shell, the improvement comprising:

a container configured to replace the brewing cartridge, the container positionable within the brewing chamber and adapted to hold brewing material while brewed by the beverage brewer, the container including:
- a receptacle configured to receive and support the brewing material, and
- a cover;

wherein the receptacle includes:
- a passageway providing fluid communication between an interior of the receptacle and the brewing chamber,
- a base, having an interior surface and an exterior surface and configured to avoid contact with the needle-like structure, and
- at least one sidewall extending upward from the interior surface of the base and configured to avoid contact with the needle-like structure;

wherein the cover is adapted to sealingly engage with a top edge of the at least one sidewall, the cover including an opening and a tamping projection that protrudes into the receptacle when the cover engages the top edge of the at least one sidewall, and wherein the container is adapted to accept the input fluid from the inlet port through the opening and to provide a corresponding outflow of fluid through the passageway.

27. The beverage brewer of claim 26, wherein the receptacle and the cover include materials such that the container is reusable.

28. The beverage brewer of claim 26, wherein the receptacle also includes at least one extension that raises the base a predetermined distance above a lower surface of the brewing chamber.

29. The beverage brewer of claim 26, wherein the passageway has an unobstructed configuration.

30. The brewing material holder of claim 26, wherein the receptacle further includes a stem that extends downward below the exterior surface of the base from around a periphery of the passageway.

31. The beverage brewer of claim 26, wherein the container further comprises a mesh filter that is configured to be disposed within the receptacle and to receive and support the brewing material in the path of the fluid flow.

* * * * *